US008059294B2

(12) United States Patent
Nakamura

(10) Patent No.: US 8,059,294 B2
(45) Date of Patent: Nov. 15, 2011

(54) IMAGE FORMING BASED ON OPERATION MODE

(75) Inventor: Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 968 days.

(21) Appl. No.: 11/996,439

(22) PCT Filed: Aug. 25, 2006

(86) PCT No.: PCT/JP2006/317294

§ 371 (c)(1),
(2), (4) Date: Jan. 22, 2008

(87) PCT Pub. No.: WO2007/026856

PCT Pub. Date: Mar. 8, 2007

(65) Prior Publication Data

US 2009/0040548 A1 Feb. 12, 2009

(30) Foreign Application Priority Data

Aug. 31, 2005 (JP) ................................ 2005-252679

(51) Int. Cl.
*G06F 15/00* (2006.01)

(52) U.S. Cl. ........ 358/1.15; 358/1.1; 358/1.13; 358/440

(58) Field of Classification Search .................. 358/1.1, 358/1.13, 1.15, 434, 435, 436, 438, 439, 358/440

See application file for complete search history.

(56) References Cited

U.S. PATENT DOCUMENTS

| | | | | |
|---|---|---|---|---|
| 5,228,118 | A * | 7/1993 | Sasaki | 358/1.13 |
| 5,924,802 | A | 7/1999 | Sakurai | 400/61 |
| 6,210,051 | B1 | 4/2001 | Sakurai | 400/62 |
| 7,086,794 | B2 | 8/2006 | Fujimaki et al. | 400/76 |
| 7,210,868 | B2 | 5/2007 | Fujimaki et al. | 400/62 |
| 2005/0108705 | A1 | 5/2005 | Koyama | 717/174 |
| 2006/0227361 | A1 | 10/2006 | Sakurai | 358/1.14 |

FOREIGN PATENT DOCUMENTS

| | | | |
|---|---|---|---|
| EP | 1 530 128 | A2 | 5/2005 |
| JP | 9-267538 | | 10/1997 |
| JP | 2002-108588 | | 4/2002 |
| JP | 2002-229751 | | 8/2002 |
| JP | 2002229751 | A * | 8/2002 |
| JP | 2003-30070 | | 1/2003 |
| JP | 2004-78377 | | 3/2004 |
| JP | 2004078377 | A * | 3/2004 |
| JP | 2004-230823 | | 8/2004 |
| JP | 2005-136822 | | 5/2005 |
| JP | 2005-141366 | | 6/2005 |

OTHER PUBLICATIONS

Dec. 5, 2006 Written Opinion and International Search Report in PCT/JP2006/317294.

* cited by examiner

*Primary Examiner* — Thomas D Lee

(74) *Attorney, Agent, or Firm* — Fitzpatrick, Cella, Harper & Scinto

(57) ABSTRACT

The operation mode of an image forming apparatus is determined. An information request transmitted from the information processing apparatus is received. On the basis of the determined operation mode, identification information containing the identifier of at least one of a plurality of image forming units provided in the image forming apparatus is transmitted in response to the received information request.

11 Claims, 25 Drawing Sheets

FIG. 1B

| TAG | VALUE |
|---|---|
| CLS | PRINTER |
| MFG | ABC |
| MDL | LBP-XXX PDL1 |
| CMD | PDL1, IEEE1284 |

FIG. 7

| SERVICE ID | SERVICE |
|---|---|
| 1 | PrintService / PDL1 |
| 2 | PrintService / PDL2 |
| 3 | PrintService / PDL3 |

FIG. 13

```
<Metadata>
        <Service>
                <EndpointReference>
                        <Address>http://192.168.0.1/print</Address>
                </EndpointReference>
                <Types>PrintService/PDL1</Types>
                <ServiceId>1</ServiceId> ~ 1301
        </Service>
        <Service>
          ...
        </Service>
</Metadata>
```

FIG. 14

```
<Metadata>
    <PrinterMetadata>
        <PrinterName>Printer in Copy Room</PrinterName>
        <DeviceId>CLS:PRINTER;MFG:ABC;MDL:LBP-XXX PDL1;CMD:PDL1,IEEE1284</DeviceID>
    </PrinterMetadata>
</Metadata>
```

FIG. 17

```xml
<Metadata>
    <Service>
        <EndpointReference>
            <Address>http://192.168.0.1/print</Address>
        </EndpointReference>
        <Types>PrintService/PDL1</Types>
        <ServiceId>1</ServiceId>
    </Service>
</Metadata>
```

FIG. 18

```
<Metadata>
    <Service>
        <EndpointReference>
            <Address>http://192.168.0.1/print</Address>
        </EndpointReference>
        <Types>PrintService/PDL1</Types>
        <ServiceId>1</ServiceId>
    </Service>
    <Service>
        <EndpointReference>
            <Address>http://192.168.0.1/print</Address>
        </EndpointReference>
        <Types>PrintService/PDL2</Types>
        <ServiceId>2</ServiceId>
    </Service>
    <Service>
        <EndpointReference>
            <Address>http://192.168.0.1/print</Address>
        </EndpointReference>
        <Types>PrintService/PDL3</Types>
        <ServiceId>3</ServiceId>
    </Service>
</Metadata>
```

FIG. 21

| HOST IP ADDRESS |
|---|
| 192.168.0.2 |
| 192.168.0.3 |

IMAGE FORMING BASED ON OPERATION MODE

TECHNICAL FIELD

The present invention relates to an image forming apparatus which is connected to a network and is communicable with an information processing apparatus on the network, a control method therefor, a program, and an image forming system including the image forming apparatus and information processing apparatus.

BACKGROUND ART

Conventionally, image forming apparatuses (e.g., printers and multifunction peripherals) that are connected to a network and receive an operation from a computer through the network are used. Some of the image forming apparatuses can extend PDLs (Page Description Languages) processible in the apparatus later to support a plurality of PDLs.

When a device serving as a peripheral device is connected to an information processing apparatus such as a host computer, the device can transmit device information containing the model name and manufacturer name to the information processing apparatus. Upon receiving the device information, the information processing apparatus can refer to the device ID in the device information and selectively install a device driver specified by the device ID. This technique is called "plug and play".

Printer driver installation processing by general plug and play will be described with reference to FIG. 1A.

Referring to FIG. 1A, a general personal computer (PC) or workstation is used as a host computer, i.e., an example of an information processing apparatus 100. Assume that a plurality of driver sets 101 to 103 are stored in the information processing apparatus 100 in advance as drivers packaged in the operating system (OS) of the apparatus.

Each of the driver sets 101 to 103 includes an INF file 104 that describes unique information to be referred to in installing the driver, various kinds of execution modules 105, and resources 106. A device ID is described in the INF file 104. The device ID is formed from the value of an MFG tag as a manufacturer name and the value of an MDL tag as a product name in device information received upon plug and play.

The device ID is used as an identifier to make an image forming apparatus (printer) accurately correspond to a device driver at the time of installation. When the information processing apparatus 100 is connected to an image forming apparatus 107 through a communication medium 108 such as USB, the image forming apparatus 107 detects the connection. After detecting the connection, the image forming apparatus 107 transmits, to the information processing apparatus 100 through the communication medium 108, device information 109 defined by IEEE1284 and containing unique information of the image forming apparatus 107. The device information 109 defined by IEEE1284 contains pieces of information shown in FIG. 1B.

Upon receiving the device information 109, the OS in the information processing apparatus 100 reads out the CLS tag from the device information 109, detects that the target of plug and play is the image forming apparatus 107, and starts installing a corresponding driver set. The OS generates a device ID including the MFG tag and MDL tag in the device information 109 and searches for a driver set with the INF file 104 containing the device ID from the driver sets 101 to 103.

When the driver set corresponding to the device information 109 is found, the various kinds of execution modules 105 and resources 106 in the driver set are installed in the OS. The installed driver set is connected to a port of the communication medium 108 that has received the device information 109. If no corresponding driver set is present in the information processing apparatus 100, the processing is ended without installation.

The device information shown in FIG. 1B will be described.

The format of the device information shown in FIG. 1B includes a "tag" column representing tag names and a "value" column representing possible tag values. A CLS tag stores "PRINTER" as its value. The CLS tag stores the apparatus type as its value. In this case, this tag indicates that the connected peripheral device is an image forming apparatus.

An MFG tag stores "ABC" as its value. The MFG tag indicates the manufacturer name. That is, it indicates that ABC is the manufacturer. An MDL tag stores "LBP-XXX PDL1" as its value. The MDL tag indicates the model name and PDL type. In this case, this tag indicates that the model of the peripheral device is LBP-XXX, and the PDL type is PDL1.

A CMD tag stores "PDL1, IEEE1284" as its value. The value of the CMD tag includes the command and PDL name to be transmitted/received through the communication medium. In this case, this tag indicates that the peripheral device would transmit/receive a command group PDL1 as the PDL type by using IEEE1284 as the communication medium type.

In the information processing apparatus 100 that has received the device information 109 shown in FIG. 1B, the OS generates a device ID "ABC LBP-XXX PDL1" for the values of the MFG and MDL tags. A driver set is searched by using the device ID as a key.

Plug-and-play techniques using a local interface such as USB or a network interface such as LAN are also proposed. Examples are SOAP (Simple Object Access Protocol)-based Web service protocols called WS-Discovery and WS-MetadataExchange.

The information processing apparatus can detect the presence of a device on the network and acquire device information from the device by using these techniques. Hence, the driver of the device on the network can be installed by the same plug and play as in the local interface.

A technique of causing an optional device attached to a device to change the device ID to change its display in a printer driver on an information processing apparatus has already been proposed (Japanese Patent Laid-Open No. 2004-230823).

A technique of notifying an information processing apparatus of a device ID that changes in accordance with the change of an extension unit to extend the function of a printer device and causing the information processing apparatus to select a device driver corresponding to the device ID has also been proposed (Japanese Patent Laid-Open No. 9-267538).

On the other hand, the scale of a user's network environment can be various, i.e., either small or large. For example, in a relatively small-scale environment including one to several information processing apparatuses and image forming apparatuses on a network, each information processing apparatus is directly connected to an image forming apparatus to acquire information or send a print instruction, as shown in FIG. 2A. Such an environment is mainly used in, e.g., SOHO without a network administrator. The user-friendliness of an image forming apparatus is important.

However, in a large-scale environment where several ten to several hundred information processing apparatuses and image forming apparatuses are connected to a network, the apparatuses are generally divided into logical domains and managed, as shown in FIG. 2B, to distribute load and increase the management efficiency. A server apparatus is normally arranged in each domain.

"Server apparatus" is a general term for apparatuses that provide various services to each user. Detailed examples of the services are a domain controller to manage a domain, a print service to temporarily spool a print job and transmit it to an image forming apparatus, and a proxy service to virtually present a printer to a user.

For example, an integrated management technology named "Active Directory" is already released from Microsoft for such a large-scale environment and widely used. A large-scale environment normally has an administrator, and each user uses administrator's settings. For this reason, the administrator is required to use the complex functions of the image forming apparatus and appropriately provide each function to the user.

Hence, even in building a print environment by plug and play, functions required by the user or administrator change depending on the network environment.

However, the above-described conventional techniques cannot flexibly apply plug and play of printer drivers in accordance with the variety of user environments. Possible user environments where image forming apparatuses having a plurality of PDLs are installed are as follows. In a small-scale environment, only one printer driver is installed in an information processing apparatus so that the user can immediately print. In a large-scale environment, printer drivers for the plurality of PDLs are installed in a server apparatus so that the user can freely select one of them. In this case, the administrator must individually set operation modes in the image forming apparatuses in accordance with their environments, resulting in inconvenience. Additionally, in searching for an image forming apparatus on the network, ON/OFF of use of multicast cannot be switched automatically in accordance with scale of environment.

DISCLOSURE OF INVENTION

The present invention has been made to solve the above problems, and has as its object to provide an image forming apparatus capable of causing an information processing apparatus to install a driver desired by a user by presenting appropriate device information to the information processing apparatus and increasing the convenience for the user, a control method of the apparatus, and a program.

According to the present invention, the foregoing object is attained by providing an image forming apparatus which is connected to a network and can communicate with an information processing apparatus on the network, comprising:

a plurality of image forming means;

determination means for determining an operation mode of the image forming apparatus;

reception means for receiving an information request transmitted from the information processing apparatus; and transmission means for transmitting, on the basis of the operation mode determined by the determination means, identification information containing an identifier of at least one of the plurality of image forming means in response to the information request received by the reception means.

In a preferred embodiment, the determination means comprises acquisition means for acquiring network information, and the determination means determines, on the basis of the network information acquired by the acquisition means, the operation mode as one of a first operation mode without intervention of a predetermined information processing apparatus and a second operation mode with intervention of a predetermined information processing apparatus.

In a preferred embodiment, the apparatus further comprises search request reception means for receiving a search request by multicast from the information processing apparatus when the operation mode is the first operation mode and receiving a search request by unicast from the information processing apparatus when the operation mode is the second operation mode.

In a preferred embodiment, when the operation mode is the first operation mode, the transmission means transmits identification information containing an identifier of a designated one of the plurality of image forming means, and when the operation mode is the second operation mode, the transmission means transmits identification information containing an identifier of each of the plurality of image forming means.

In a preferred embodiment, the acquisition means issues a search request by multicast to the network and acquires the network information on the basis of presence/absence of a response to the search request.

In a preferred embodiment, the acquisition means checks presence/absence of DNS setting information and, if DNS setting is present, issues a search request to a DNS server and acquires the network information on the basis of an analysis result of a response to the search request.

In a preferred embodiment, the apparatus further comprises designation means for designating priority image forming means from the plurality of image forming means.

In a preferred embodiment, the apparatus further comprises:

search request reception means for receiving a search request by multicast from the information processing apparatus; and storage means for storing identification information representing the information processing apparatus that has transmitted the search request received by the search request reception means, wherein the transmission means compares, on the basis of the operation mode determined by the determination means, the identification information stored in the storage means with identification information of an information processing apparatus that has transmitted the information request received by the reception means and, on the basis of a comparison result, transmits the identification information containing the identifier of at least one of the plurality of image forming means.

In a preferred embodiment, the apparatus further comprises change means for changing the second operation mode to the first operation mode upon detecting a network disconnection notification from the information processing apparatus and changing the first operation mode to the second operation mode upon detecting a network participation notification from the information processing apparatus.

According to the present invention, the foregoing object is attained by providing an image forming system formed by connecting an image forming apparatus to an information processing apparatus through a network, the image forming apparatus comprises:

a plurality of image forming means;

determination means for determining an operation mode of the image forming apparatus;

first reception means for receiving an information request transmitted from the information processing apparatus; and transmission means for transmitting, on the basis of the operation mode determined by the determination means, identification information containing an identifier of at least one of the plurality of image forming means in response to the information request received by the first reception means, and the information processing apparatus comprises:

second reception means for receiving the identification information from the image forming apparatus; and installation means for installing a device driver to use the image forming apparatus on the basis of the identification information received by the second reception means.

According to the present invention, the foregoing object is attained by providing a control method of an image forming apparatus which is connected to a network and can communicate with an information processing apparatus on the network, comprising steps of:

determining an operation mode of the image forming apparatus;

receiving an information request transmitted from the information processing apparatus; and transmitting, on the basis of the operation mode determined in the determination step, identification information containing an identifier of at least one of a plurality of image forming means provided in the image forming apparatus in response to the information request received in the reception step.

According to the present invention, the foregoing object is attained by providing a program stored in a computer-readable storage medium, which causes a computer to execute control of an image forming apparatus which is connected to a network and can communicate with an information processing apparatus on the network, characterized by causing the computer to execute steps of:

determining an operation mode of the image forming apparatus;

receiving an information request transmitted from the information processing apparatus; and transmitting, on the basis of the operation mode determined in the determination step, identification information containing an identifier of at least one of a plurality of image forming means provided in the image forming apparatus in response to the information request received in the reception step.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention, and together with the description, serve to explain the principles of the invention.

FIG. 1B is a view for explaining device information defined by IEEE1284;

FIG. 7 is a view showing an example of service list information according to the first embodiment of the present invention;

FIG. 13 is a view showing an example of device information according to the first embodiment of the present invention;

FIG. 14 is a view showing an example of service information according to the first embodiment of the present invention;

FIG. 17 is a view showing an example of device information in a Direct mode according to the first embodiment of the present invention;

FIG. 18 is a view showing an example of device information in a Proxy mode according to the first embodiment of the present invention;

FIG. 21 is a view showing an example of search log information according to the second embodiment of the present invention;

BEST MODE FOR CARRYING OUT THE INVENTION

Preferred embodiments of the present invention will be described in detail in accordance with the accompanying drawings.

First Embodiment

Figure 1A:
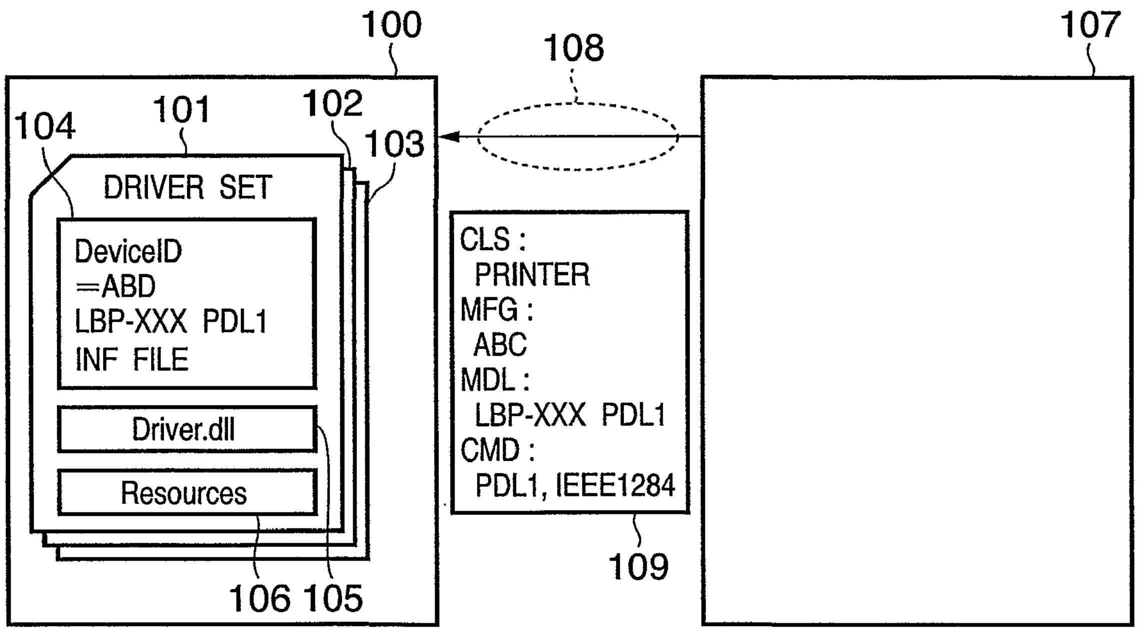
FIG. 1A is a view for explaining printer driver installation processing using plug and play.
Figure 2A:
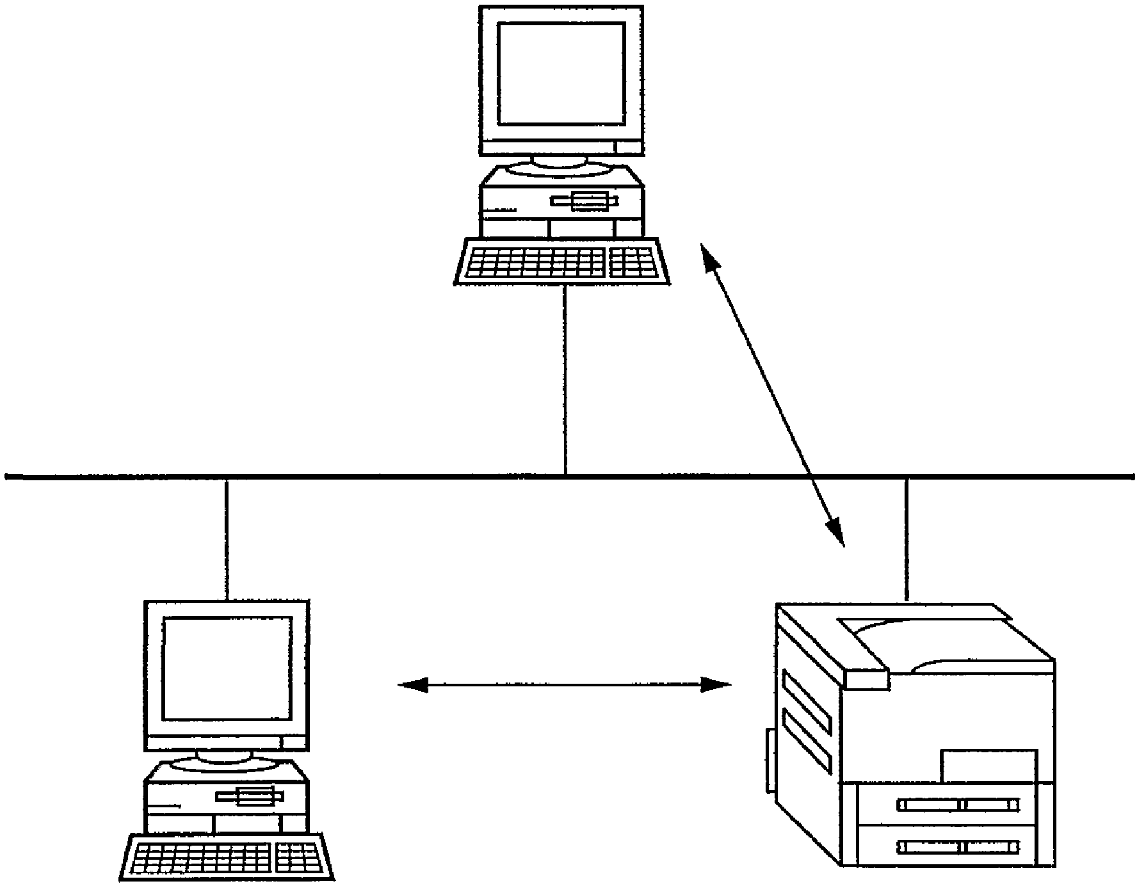
FIG. 2A is a view showing an arrangement example of a small-scale network.
Figure 2B:
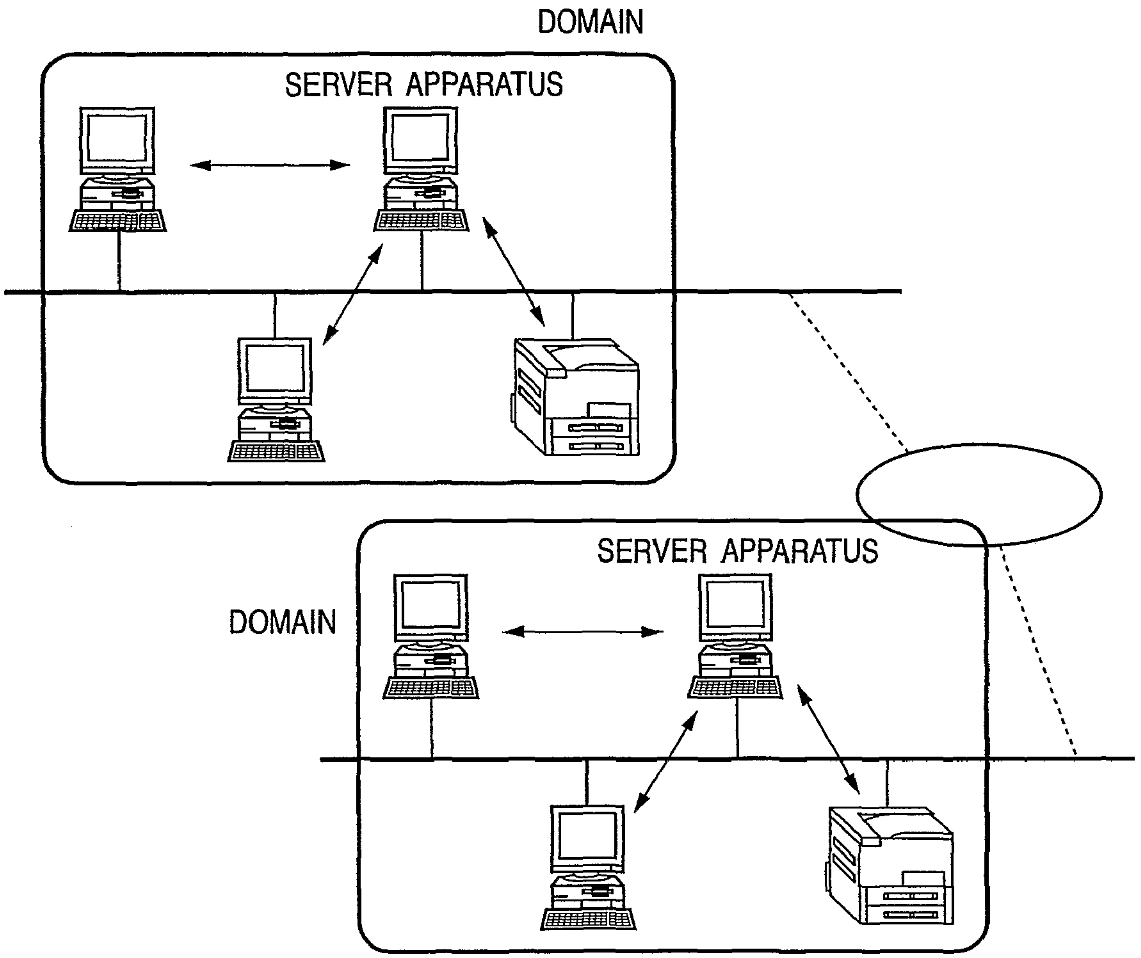
FIG. 2B is a view showing an arrangement example of a large-scale network.
Figure 3:
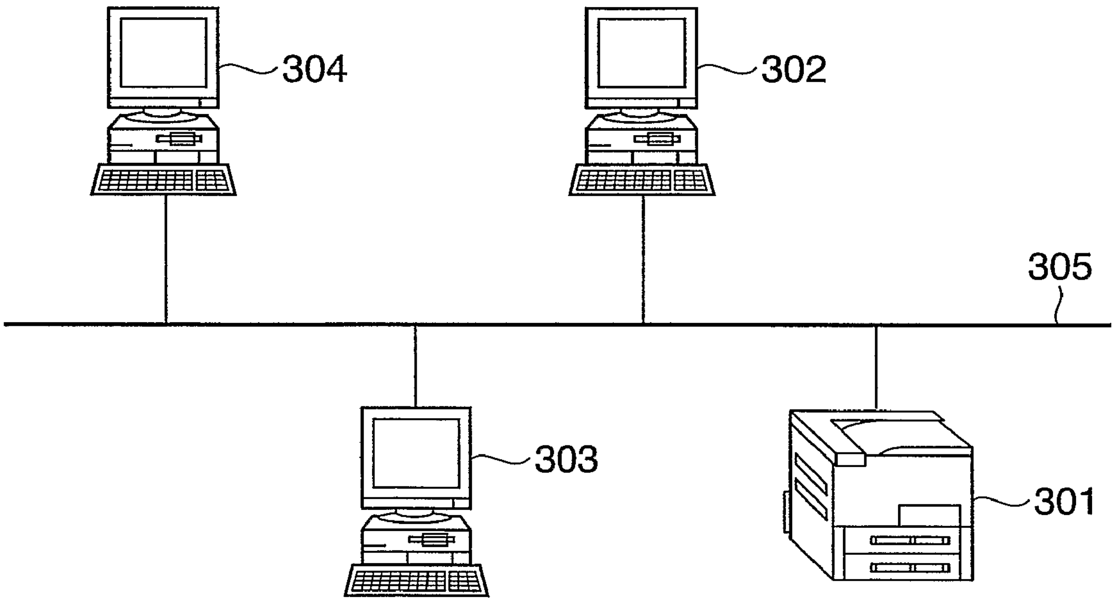
FIG. 3 is a view showing a configuration example of an image forming system according to the first embodiment of the present invention.

FIG. 3 is a view showing a configuration example of an image forming system according to the first embodiment of the present invention.

In the image forming system shown in FIG. 3, a device 301 and host computers 302 to 304 are connected to each other through a network 305.

In a large-scale environment, a host computer has various kinds of server functions such as a domain controller, print service, and proxy service and can provide the services to other host computers. In the present invention, "Server apparatus" will be used as a general term for host computers having the server functions.

The network 305 is a so-called communication network that is typically implemented by one of the Internet, LAN, WAN, telephone line, dedicated digital line, ATM, frame relay line, communication satellite channel, cable TV line, and data broadcast channel or a combination thereof. The network 305 only needs to transmit/receive data.

The hardware configuration of the device 301 will be described next with reference to FIG. 4.

Figure 4:
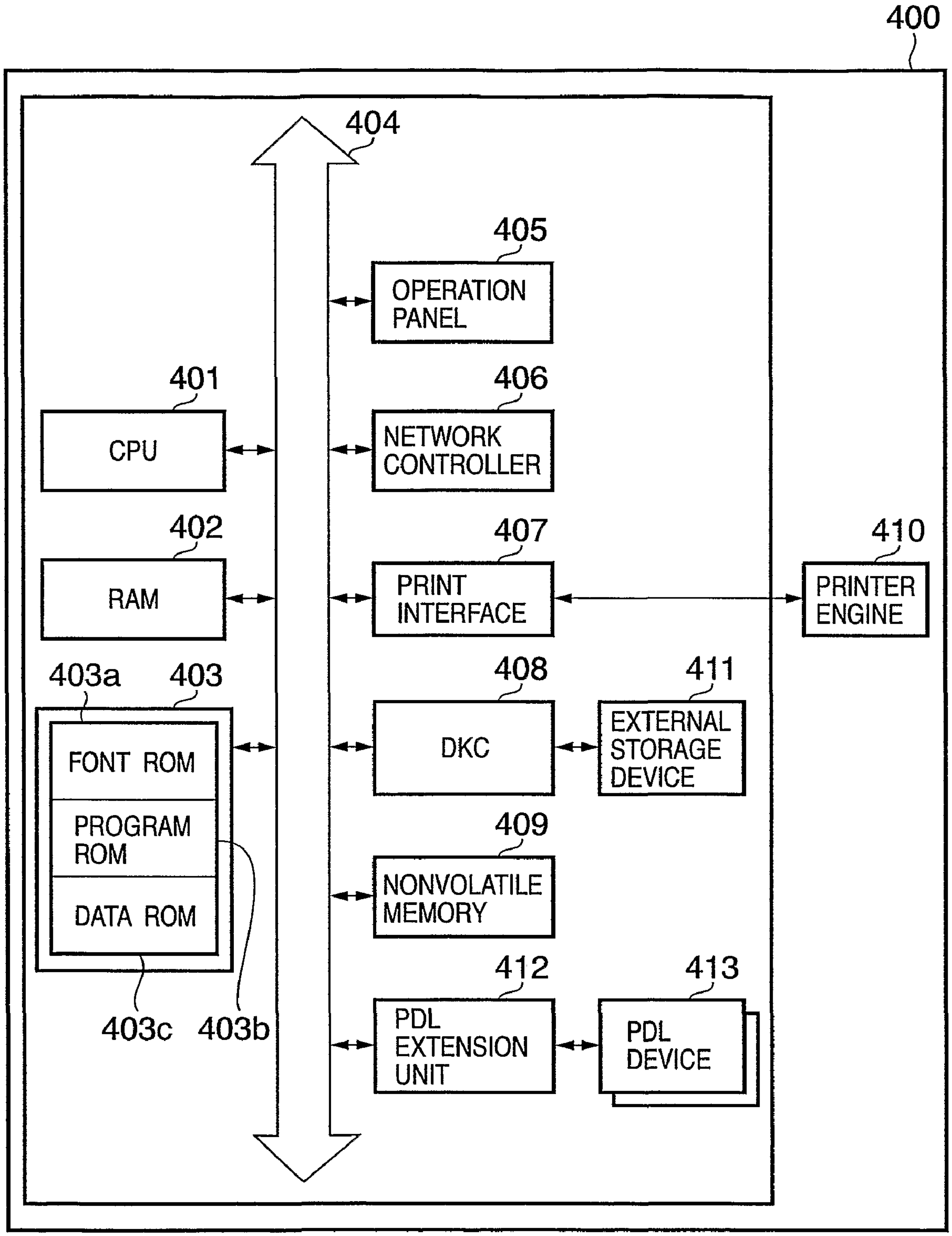
FIG. 4 is a block diagram showing the hardware configuration of a device according to the first embodiment of the present invention.

FIG. 4 is a block diagram showing the hardware configuration of the device according to the first embodiment of the present invention.

As the device, a laser beam printer 400 serving as an image forming apparatus will be exemplified here.

In the printer 400 shown in FIG. 4, a CPU 401 collectively controls access to various devices connected to a system bus 404 on the basis of a control program stored in a program ROM 403*b* of a ROM 403. The CPU 401 outputs an image signal as output information to a print unit (printer engine) 410 connected through a print interface 407.

The control program stored in the program ROM 403*b* includes programs to implement various flowcharts to be described later. The CPU 401 executes various processing operations shown in the flowcharts by executing the programs. The control program stored in the program ROM 403*b* also includes a program to convert an input PDL (Page Description Language) to bitmap data printable by the printer engine 410. When the program is executed by the CPU 401, the printer 400 functions as an image forming means.

The program ROM 403*b* of the ROM 403 stores control programs executable by the CPU 401. A font ROM 403*a* of the ROM 403 stores font data (including outline font data) to be used to generate output information. A data ROM 403*c* of the ROM 403 stores data to be used on the host computer (e.g., host computer 302).

The CPU 401 can execute communication processing with the host computer on the network 305 through a network controller 406. A RAM 402 mainly functions as the main memory or work area of the CPU 401. The RAM 402 is designed to extend the memory capacity by using an optional RAM connected to an extension port (not shown). The RAM 402 is used as an output information rasterization area or environment data storage area.

Access to an external storage device 411 such as a hard disk (HD) or IC card is controlled by a disk controller (DKC) 408. The external storage device 411 is used as a job storage area to store font data, an emulation program, and form data, temporarily spool a print job, and control the spooled job from the outside.

An operation panel 405 includes, e.g., a touch panel, and various keys and buttons so that the user can input various kinds of information from software keys displayed on the touch panel. A nonvolatile memory 409 stores various kinds of information such as printer mode setting information input from the operation panel 405.

Various extension units such as a finisher to execute stapling and sorting and a double-sided printing unit to implement double-sided printing can be attached to the printer 400 as options. The operations of the units are controlled from the CPU 401.

A PDL extension unit 412 connects at least one PDL device (PDL board) 413 which can be controlled from the CPU 401. The PDL device 413 serves as an image forming unit (image forming means) having a function of interpreting print data (PDL) received from the host computer and converting the data into bitmap data printable by the printer engine 410. At least one PDL device 413 is normally connected. More PDL devices 413 can be added later. Device information defined by IEEE1284 used in plug and play is held by the PDL device 413.

In the first embodiment to be described below, the device is assumed to have three PDL devices PDL1 to PDL3 unless otherwise specified.

Expansion of the PDL device may be done by physically adding an expansion board with a dedicated PDL device to the printer 400. If the PDL device is implemented by a program, a corresponding program may be added to the program ROM 403*b*. A PDL device may be added by storing programs corresponding to a plurality of kinds of PDL devices in the program ROM 403*b* in advance and validating a necessary PDL device by using a license key input by user operation.

Examples of the PDL are LIPS, PostScript, and PCL.

The detailed arrangement of the host computer 302 or 303 will be described next with reference to FIG. 5.

Figure 5:
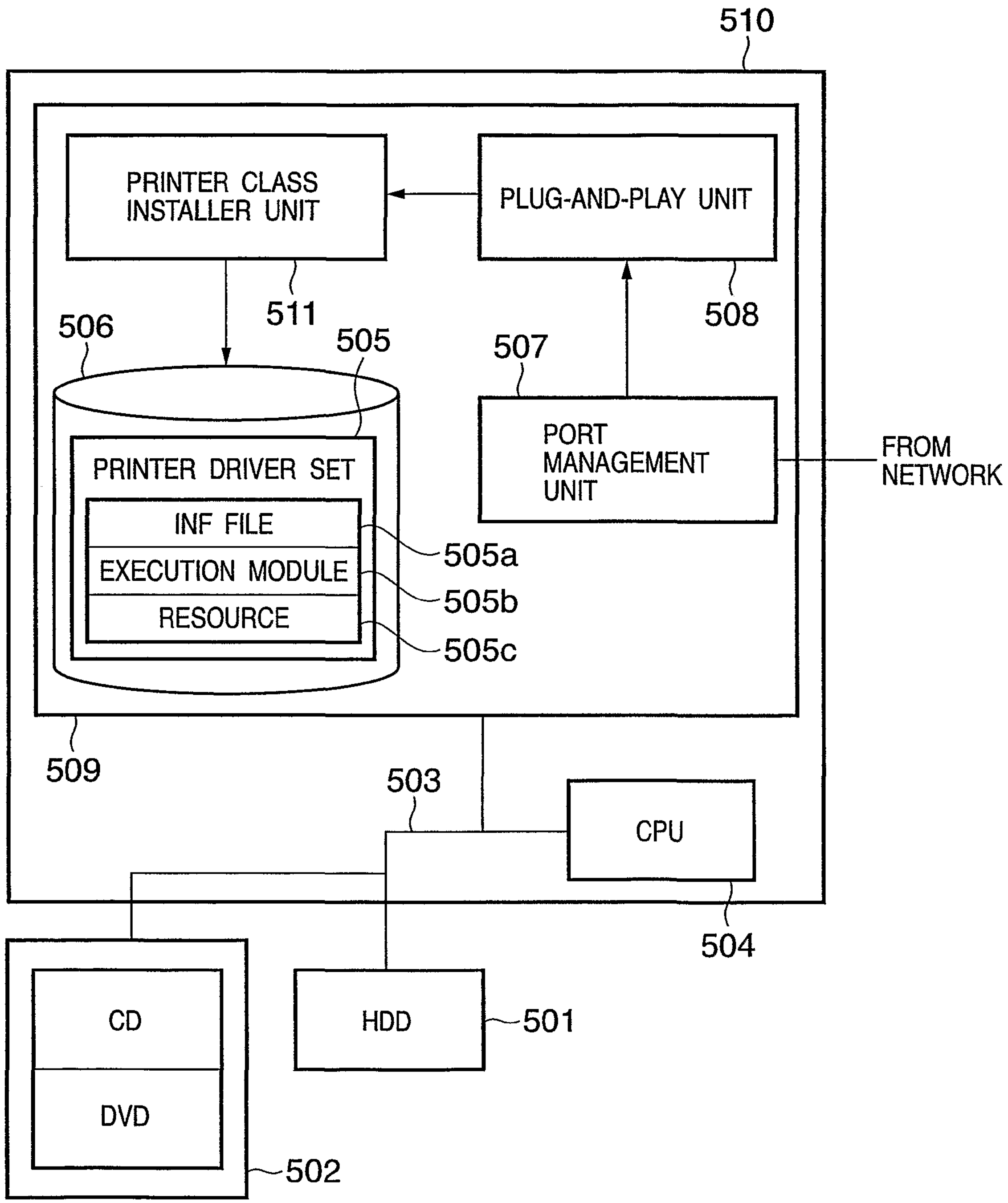
FIG. 5 is a block diagram showing the detailed arrangement of a host computer according to the first embodiment of the present invention.

FIG. 5 is a block diagram showing the detailed arrangement of the host computer according to the first embodiment of the present invention.

In an information processing apparatus 510 corresponding to each of the host computers 302 to 304, an HDD 501 is a hard disk drive with a large capacity. The HDD 501 can store in advance a program module to be loaded to a RAM 509 and a driver set 505 including an INF file. An external storage device 502 including a CD/DVD-ROM/RAM drive also has the same function.

A program module group implemented on the RAM 509 includes a port management unit 507, plug-and-play unit 508, printer class installer unit 511, and at least one printer driver set 505 managed on a driver library 506. The RAM 509 reads out the program modules from the HDD 501 and executes them as needed.

A CPU 504 collectively controls the printer class installer unit 511, plug-and-play unit 508, port management unit 507, and driver library 506, reads out each processing from the HDD 501 to the RAM 509, and executes the processing.

A BUS 503 connects the various constituent elements (CPU 504, RAM 509, HDD 501, and external storage device 502) of the information processing apparatus 510 to each other.

The port management unit 507 controls the interface on the side of the information processing apparatus 510 connected to the network 305 for communication with the device 400. In automatically installing a printer driver, the port management unit 507 receives device information defined by IEEE1284 and transfers it to the plug-and-play unit 508.

The plug-and-play unit 508 is a module to execute information control with a device for plug and play. The plug-and-play unit 508 generates a device ID from the values of MFG and MDL tags in the device information received from the port management unit 507. The plug-and-play unit 508 then transfers the generated device ID to the printer class installer unit 511.

The printer class installer unit 511 is a module to install a printer driver. On the basis of the device ID received from the plug-and-play unit 508, the printer class installer unit 511 searches for a printer driver set corresponding to the device ID from at least one printer driver set 505. When the printer driver set is found, the printer driver is installed and assigned to a necessary port.

The printer driver set 505 includes an execution module group 505*b* such as a DLL, a resource 505*c*, and an INF file 505*a* that describes their features for installation in correspondence with a printer driver.

Initialization processing when the device 400 is activated will be described next with reference to FIG. 6.

Figure 6:
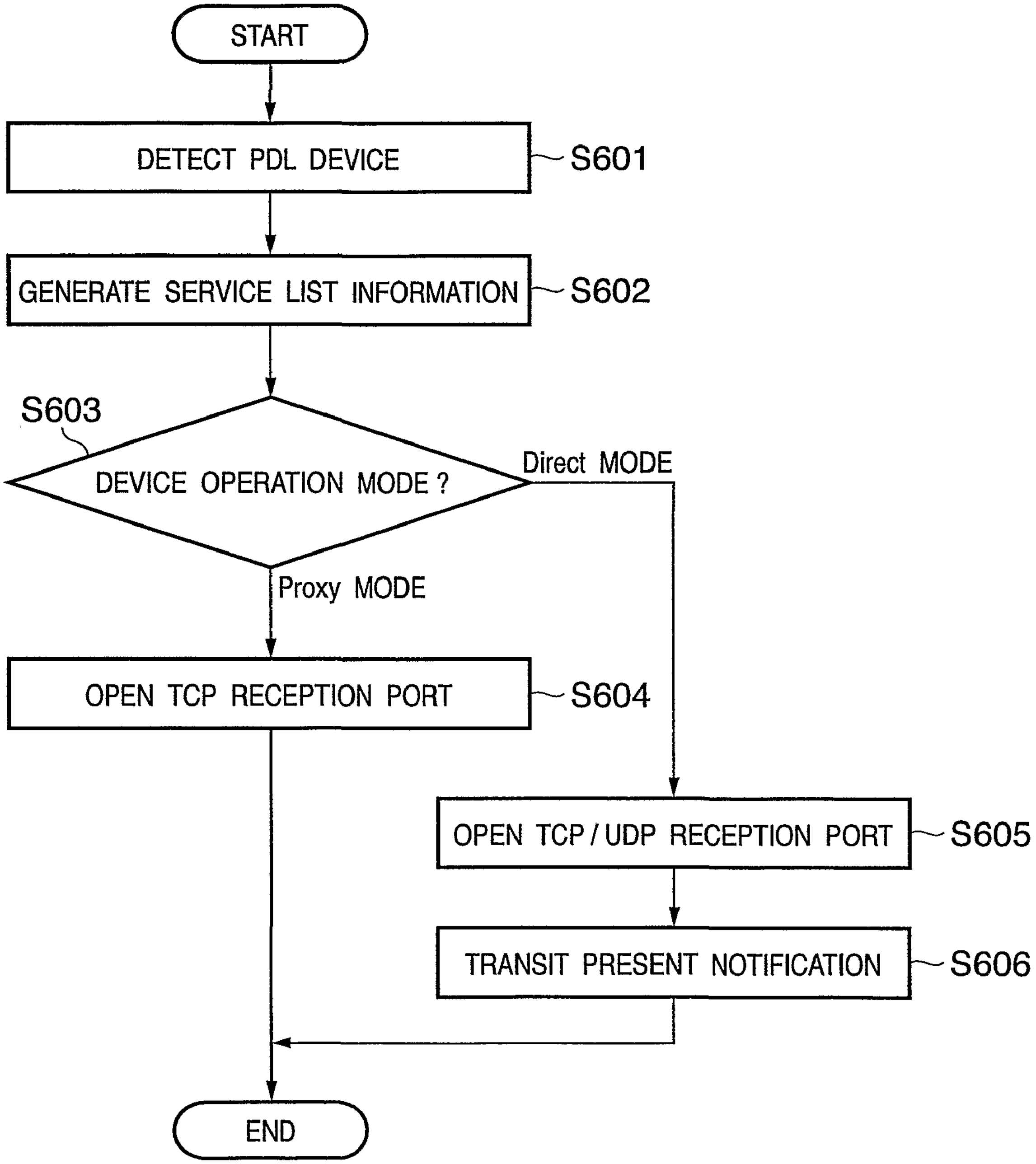
FIG. 6 is a flowchart showing initialization processing when the device according to the first embodiment of the present invention is activated.

FIG. 6 is a flowchart showing initialization processing when the device according to the first embodiment of the present invention is activated.

When activated, the device 400 detects a PDL device attached to it in step S601. In step S602, the device 400 generates internal service list information representing services that can be provided and saves the information in the RAM 402. FIG. 7 shows an example of service list information. In the service list information, PDL devices functioning in the device 400 and their services are managed. An identifier is added to each service as an unique ID (service ID). That is, the device 400 manages each PDL device as one PrintService and assigns a service ID to each service in the service list information.

In step S603, the operation mode of the device is determined by a method to be described later.

If the operation mode is a Direct mode (first operation mode), the flow advances to step S605 to open a port to receive a device search request. In this case, a TCP/UDP reception port to receive both the TCP protocol and the UDP protocol is opened. Then, in step S606, a device presence notification is transmitted by multicast.

If the operation mode is a Proxy mode (second operation mode), the flow advances to step S604 to open a port to receive a device search request. In this case, only a TCP reception port to receive the TCP protocol is opened. The TCP protocol is a connection-oriented protocol. Hence, it responds not to a device search request from the information processing apparatus by multicast but only to a device search request with a designated IP address by unicast.

An example of operation mode determination processing in step S603 will be described next with reference to FIG. 8.

Figure 8:
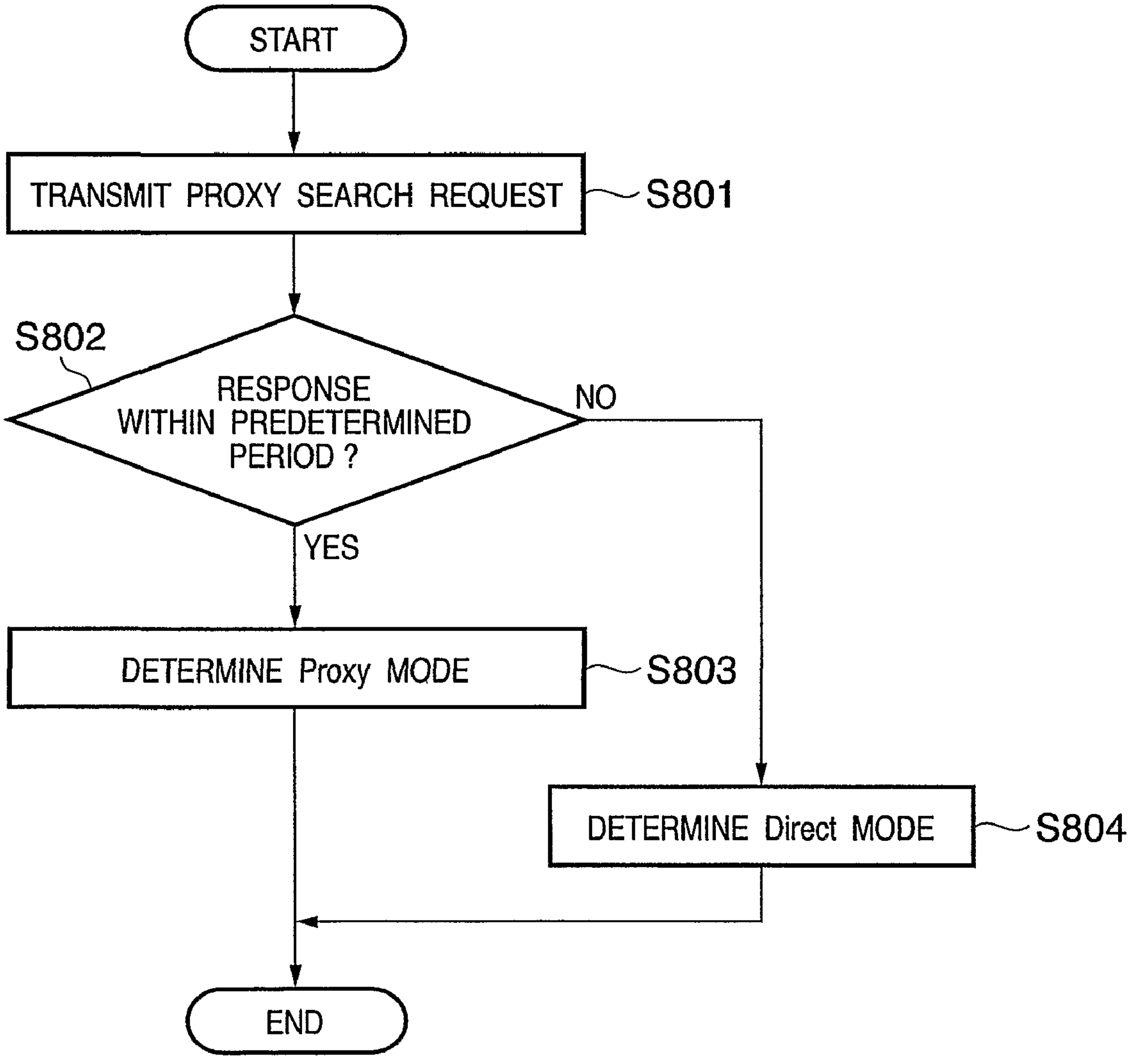
FIG. 8 is a flowchart showing an example of operation mode determination processing in step S603 according to the first embodiment of the present invention.

FIG. 8 is a flowchart showing an example of operation mode determination processing in step S603 according to the first embodiment of the present invention.

Referring to FIG. 8, the device 400 determines the operation mode of its own by issuing a proxy search request to search for a server apparatus having a proxy service by using multicast and determining the presence/absence of a response.

In step S801, the device 400 transmits a proxy search request by multicast. In step S802, the device 400 determines whether a response is received within a predetermined period (e.g., 5 sec). If a response is received (YES in step S802), the flow advances to step S803 to determine that the operation mode is the Proxy mode and hold the determination result in the RAM 402. If no response is received (NO in step S802), the flow advances to step S804 to determine that the operation mode is the Direct mode and hold the determination result in the RAM 402.

As described above, in FIG. 8, the presence/absence of a server apparatus having a server function such as a proxy service can be determined on the basis of the presence/absence of a response to a proxy search request. The determination result can be used as network information about the network environment connected to the device.

More specifically, when a response to a proxy search request is received, network information representing that a server apparatus is present in the network environment can be acquired. In this case, the operation mode of the device is determined to be the Proxy mode. When no response to a proxy search request is received, network information representing that no server apparatus is present in the network environment, i.e., all host computers on the network are clients can be acquired. In this case, the operation mode of the device is determined to be the Direct mode.

Another example of operation mode determination processing in step S603 will be described next with reference to FIG. 9.

Figure 9:
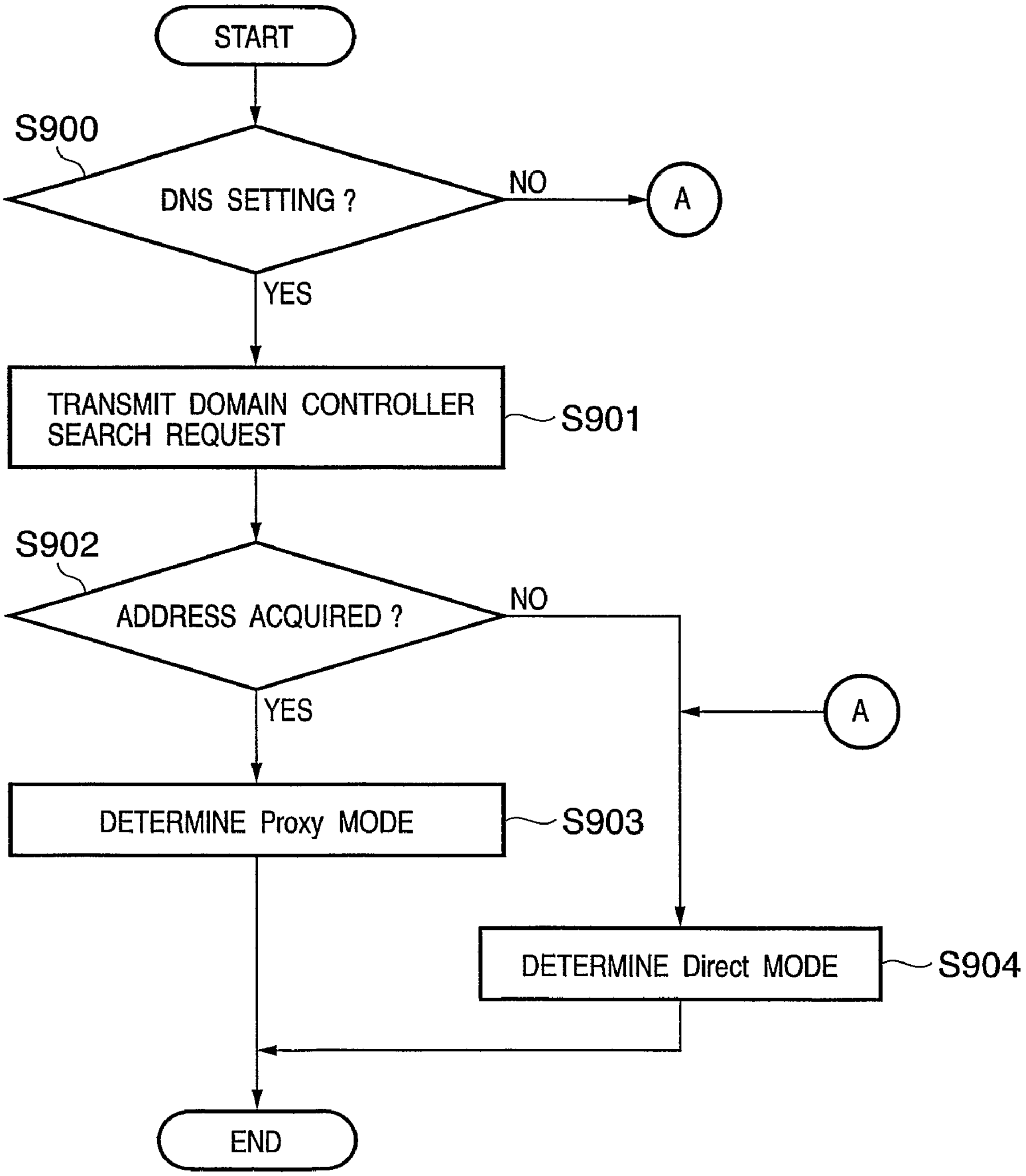
FIG. 9 is a flowchart showing another example of operation mode determination processing in step S603 according to the first embodiment of the present invention.

FIG. 9 is a flowchart showing another example of operation mode determination processing in step S603 according to the first embodiment of the present invention.

Referring to FIG. 9, the device 400 determines the operation mode of its own by searching for a server apparatus having a domain controller by using DNS (Domain Name System).

In step S900, the device 400 determines the presence/absence of DNS setting. If no DNS setting is present (NO in step S900), the flow advances to step S904 to determine that the operation mode is the Direct mode and hold the determination result in the RAM 402. If DNS setting is present (YES in step S900), the flow advances to step S901.

In step S901, a presence/absence search request is transmitted to a DNS server address set in the nonvolatile memory 409 in advance. In step S902, a response from the DNS server is received, and it is determined whether the address of the domain controller is acquired. If the address is acquired (YES in step S902), the flow advances to step S903 to determine that the operation mode is the Proxy mode and hold the determination result in the RAM 402. If no address is acquired (NO in step S902), the flow advances to step S904 to determine that the operation mode is the Direct mode and hold the determination result in the RAM 402.

As described above, in FIG. 9, the presence/absence of DNS setting on the device is determined. If DNS setting is present, a domain controller search request is transmitted to the DNS server, and a response from the DNS server is analyzed. With this processing, the presence/absence of a server apparatus having a server function such as a proxy service can be determined. The determination result can be used as network information about the network environment connected to the device.

More specifically, when DNS setting is present, network information representing that a server apparatus is present in the network environment can be acquired. In this case, the operation mode of the device is determined to be the Proxy mode. When no DNS setting is present, network information representing that no server apparatus is present in the network environment, i.e., all host computers on the network are clients can be acquired. In this case, the operation mode of the device is determined to be the Direct mode.

The domain controller search request uses an SRV record in DNS that is released in RFC2052. A domain controller registers an SRV record with a predetermined name in the DNS server. Hence, the device can transmit a search request by using the name of the SRV record as a key.

The present invention is not limited to this. The operation mode may be set in the device in advance by the administrator so that the operation mode can be determined by referring to the setting information.

A driver installation method as the base of the present invention will be described next.

In a small-scale environment without any server apparatus, like the configuration example of the image forming system shown in FIG. 3, all host computers are clients. Each client searches for a device by multicast and acquires device information from the found device, thereby automatically installing a driver.

In such a small-scale environment, the image forming apparatus operates in the Direct mode (first operation mode) to receive a device search request by multicast. In other words, the Direct mode is an operation mode without intervention of a server apparatus (predetermined information processing apparatus).

In a large-scale environment with a server apparatus, host computers except the server apparatus are clients. The administrator manages the IP address of each device on the network. A device is searched for by unicast by inputting the IP address of the device on the server apparatus.

Then, the device information of the found device is acquired, and a device driver is installed in the server apparatus. The device driver installed in the server apparatus is open to the public on the network. Hence, a client can print through the server apparatus by only connecting itself to the server apparatus and selecting a desired device (printer).

In such a large-scale environment, the image forming apparatus operates in the Proxy mode (second operation mode) to receive a device search request by unicast. In other words, the Proxy mode is an operation mode with intervention of a server apparatus (predetermined information processing apparatus).

The sequence of printer driver installation implemented between the information processing apparatus (host computer) 510 and the device (printer) 400 will be described next with reference to FIG. 10.

Figure 10:
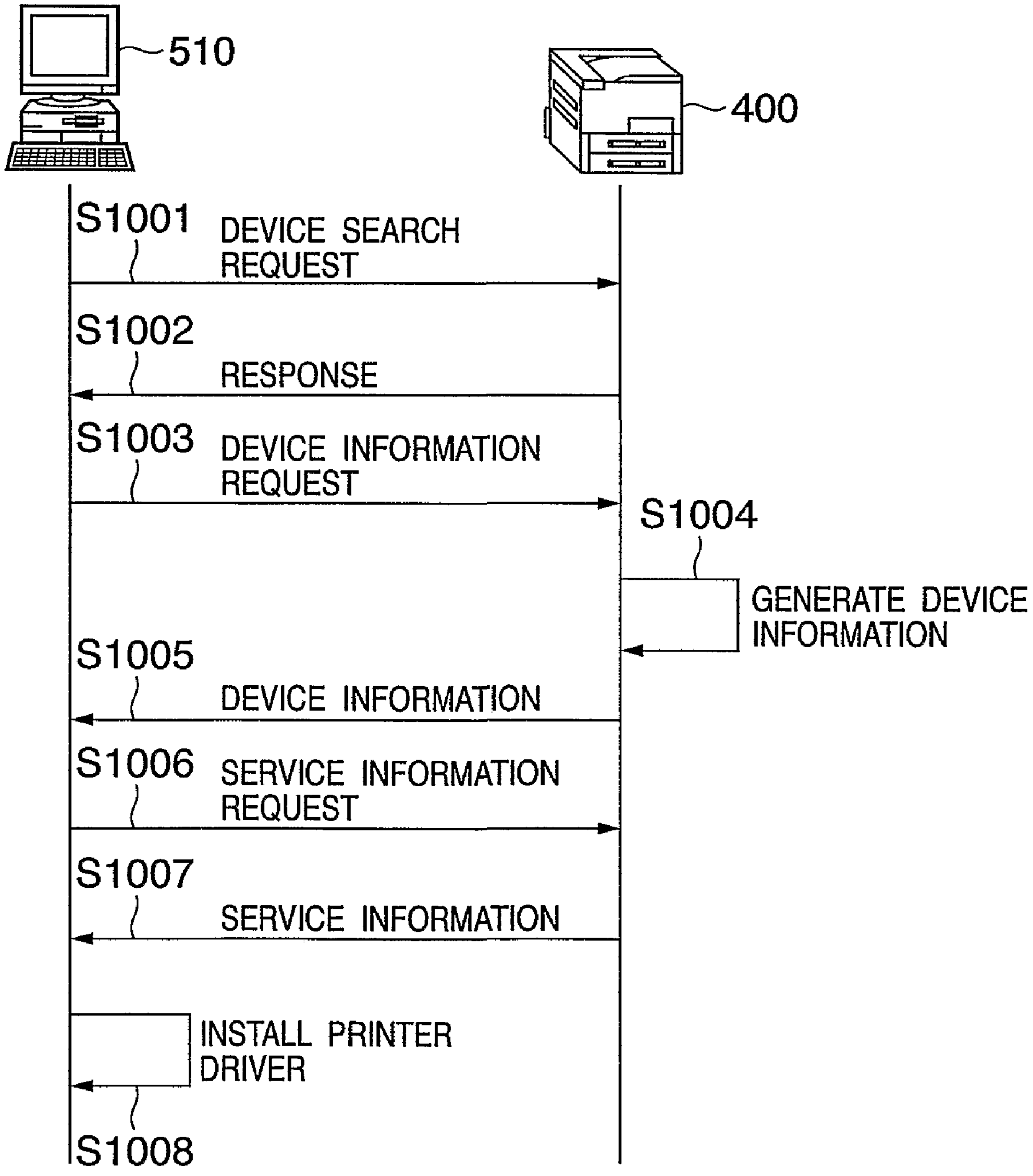
FIG. 10 is a sequence chart of printer driver installation according to the first embodiment of the present invention.

FIG. 10 is a sequence chart of printer driver installation according to the first embodiment of the present invention.

In step S1001, the information processing apparatus 510 transmits a device search request to the network. As described above, when the information processing apparatus 510 is a client, the device search request is transmitted by multicast. When the information processing apparatus 510 is a server apparatus, the device search request is transmitted by unicast.

Figure 11:
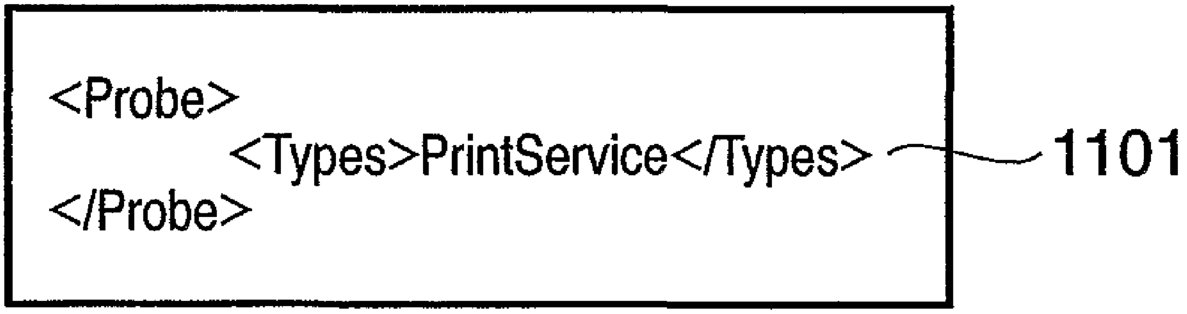
FIG. 11 is a view showing an example of a device search request according to the first embodiment of the present invention.

The device search request is information described by, e.g., an XML format shown in FIG. 11. A <Types> element 1101 in FIG. 11 describes the type of device as the search target. For example, the type of function such as a print service or scan service or the type of PDL device such as a print service with PDL1 can be described.

In multicast, all devices existing in the multicast reachable range receive the device search request. In unicast, a designated device receives the device search request. In either case, the device that has received the device search request determines in accordance with the flowchart in FIG. 12 to be described later whether it matches the search condition indicated by the device search request.

When the device search request is transmitted by multicast, and it is determined that the device 400 matches the search condition, the device 400 transmits a response to the device search request to the information processing apparatus 510 in step S1002. If the device 400 does not match the search condition, no response to the device search request is returned.

When the device search request is transmitted by unicast, and it is determined that the device 400 matches the search condition, the device 400 transmits a response to the device search request to the information processing apparatus 510 in step S1002. If the device 400 does not match the search condition, the device 400 transmits an error message to the information processing apparatus 510.

In step S1003, the information processing apparatus 510 transmits a device information request to the found device (the device that has transmitted the response). If the device 400 should issue a network participation notification, the device 400 transmits the network participation notification to the information processing apparatus 510 instead of the processing in steps S1001 and S1002. In step S1003, the information processing apparatus 510 transmits a device information request to the device on the basis of the network participation notification from the device 400.

Upon receiving the device information request, the device 400 generates device information by a method (to be described later) in step S1004. In step S1005, the generated device information is transmitted to the information processing apparatus 510.

The device information (identification information) is described in, e.g., an XML format shown in FIG. 13 and contains a list of services provided by the device. The value of a <ServiceID> element 1301 in FIG. 13 indicates a unique ID (service ID), i.e., an identifier to identify each service and is used to specify a necessary service later.

In step S1006, the information processing apparatus 510 designates a necessary service ID from the received device information and transmits a service information request. Upon receiving the service information request, the device 400 acquires the value of device information from a PDL device corresponding to the designated service ID and transmits service information containing the value to the information processing apparatus 510 in step S1007. The service information is described in, e.g., an XML format shown in FIG. 14.

In step S1008, the information processing apparatus 510 refers to the service information received from the device 400 and installs a corresponding printer driver. If the device 400 transmits device information containing a plurality of service lists to the information processing apparatus 510 in step S1005, steps S1006 to S1008 are repeated. With this processing, printer drivers equal in number to the listed services are installed.

Determination processing of determining whether the device 400 that has received the device search request matches the search condition indicated by the request in the sequence shown in FIG. 10 will be described next with reference to FIG. 12.

Figure 12:
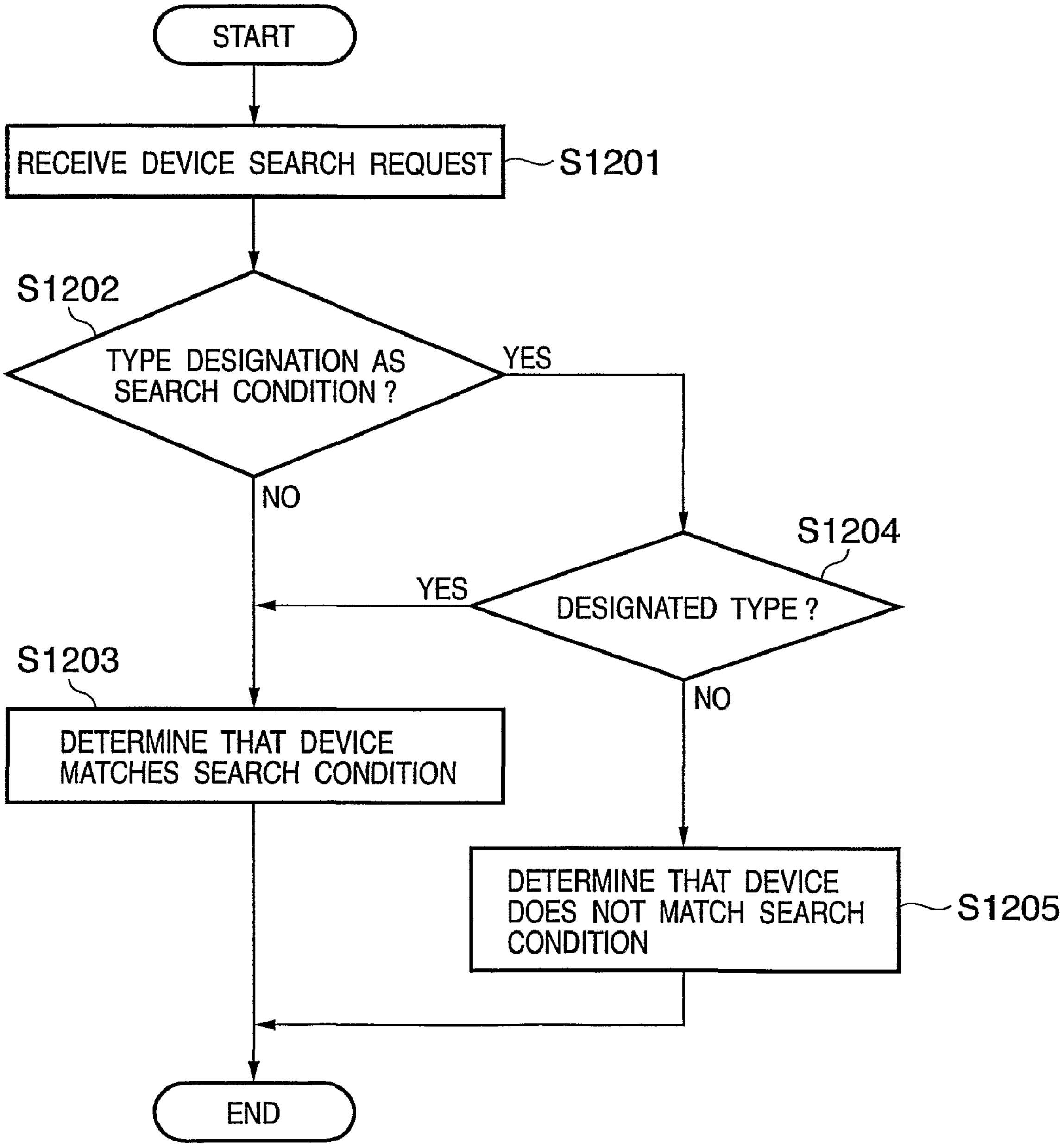
FIG. 12 is a flowchart showing determination processing according to the first embodiment of the present invention.

FIG. 12 is a flowchart showing determination processing according to the first embodiment of the present invention.

In step S1201, the device 400 receives a device search request. In step S1202, the presence/absence of type designation by a <Types> tag in the device search request is determined as the search condition. If no type designation is present (NO in step S1202), the received device search request indicates exhaustive device search. The flow advances to step S1203 to determine that the device 400 matches the search condition.

If type designation is present (YES in step S1202), the flow advances to step S1204 to determine whether the designated type is included in the type of the device itself. If the designated type is included in the type of the device itself (YES in step S1204), the flow advances to step S1203. If the designated type is not included in the type of the device itself (NO in step S1204), the flow advances to step S1205 determine that the device 400 does not match the search condition.

The type of the device itself used for determination in step S1204 indicates the PDL device attached to the device 400 and the service of the PDL device which are indicated by the service list information shown in FIG. 7.

Generation processing of causing the device to generate a service list contained in device information in step S1004 of the sequence shown in FIG. 10 will be described next with reference to FIG. 15.

Figure 15:
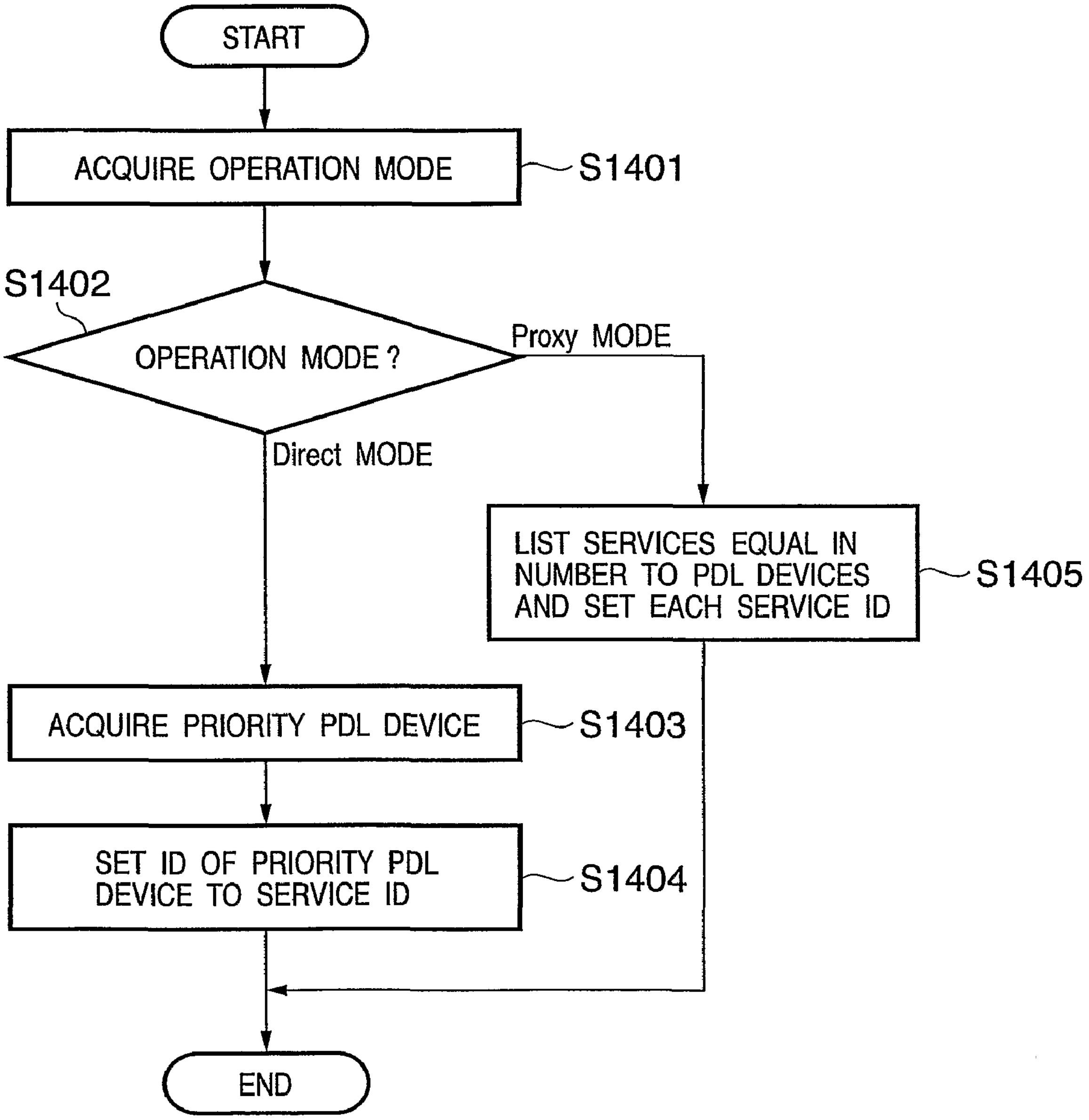
FIG. 15 is a flowchart showing generation processing according to the first embodiment of the present invention.

FIG. 15 is a flowchart showing generation processing according to the first embodiment of the present invention.

In step S1401, the value of the operation mode held in the RAM 402 is acquired. In step S1402, the operation mode of its own is determined on the basis of the acquired value. If the operation mode is the Direct mode, the flow advances to step S1403 to acquire a priority PDL device to be preferentially used in the PDL devices provided in the device.

Figure 16:
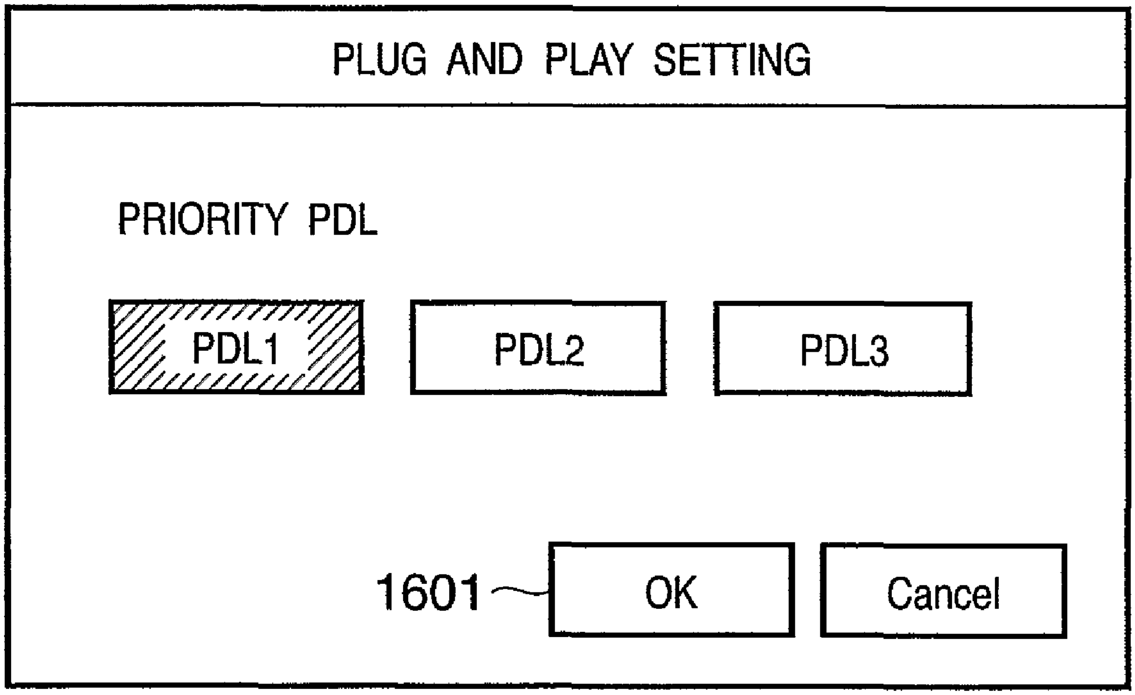
FIG. 16 is a view showing an example of a priority PDL device setting window according to the first embodiment of the present invention.

For example, a priority PDL device can be selected from PDL devices (PDL1 to PDL3) in the list by using a priority PDL device setting window displayed on the operation panel 405 of the device 400 as shown in FIG. 16. The set value is saved in the nonvolatile memory 409. In the example shown in FIG. 16, PDL1 is selected as the priority PDL device in the initial state. The user can change the priority PDL device as needed. The changed setting can be determined by operating an OK button 1601. When an optional PDL device (PDL board) is attached to the image forming apparatus, the optional PDL device (PDL board) can be set with priority over the internal PDL device of the image forming apparatus.

In step S1404, the service ID assigned to the priority PDL device acquired in step S1403 is set as the value of <ServiceID> in the device information. As a result, only one service is set in the service list of the device information.

If the operation mode is the Proxy mode, the flow advances to step S1405. Assume that the number of services equals the number of PDL devices (PDL1, PDL2, and PDL3) in the service list information shown in FIG. 7. Hence, service IDs assigned to the respective PDL devices provided in the device are set as the values of <ServiceID> of the services.

FIGS. 17 and 18 show examples of device information generated by the above-described processing. FIG. 17 shows an example in the Direct mode. FIG. 18 shows an example in the Proxy mode.

As described above, according to the first embodiment, the image forming apparatus generates device information to be presented to the information processing apparatus as needed in accordance with the network environment so that an appropriate printer driver can be installed in the information processing apparatus. Hence, the convenience for the user and administrator can be improved.

In addition, since the image forming apparatus switches ON/OFF of use of multicast processing in accordance with the network environment, any increase in network traffic can be prevented, and the network utilization efficiency can be increased.

Second Embodiment

In the second embodiment, even in the Proxy mode, a device receives a device search request by multicast.

At this time, host information (identification information) representing the information processing apparatus of the transmission source is stored. Upon relieving a device information request, the image forming apparatus compares host information in the request with the host information stored in the apparatus and generates device information on the basis of the comparison result. This arrangement will be described.

Especially, according to the arrangement of the second embodiment, even in a large-scale environment with a server apparatus, an information processing apparatus that does not use the server apparatus can easily install a printer driver and use it.

Figure 19:
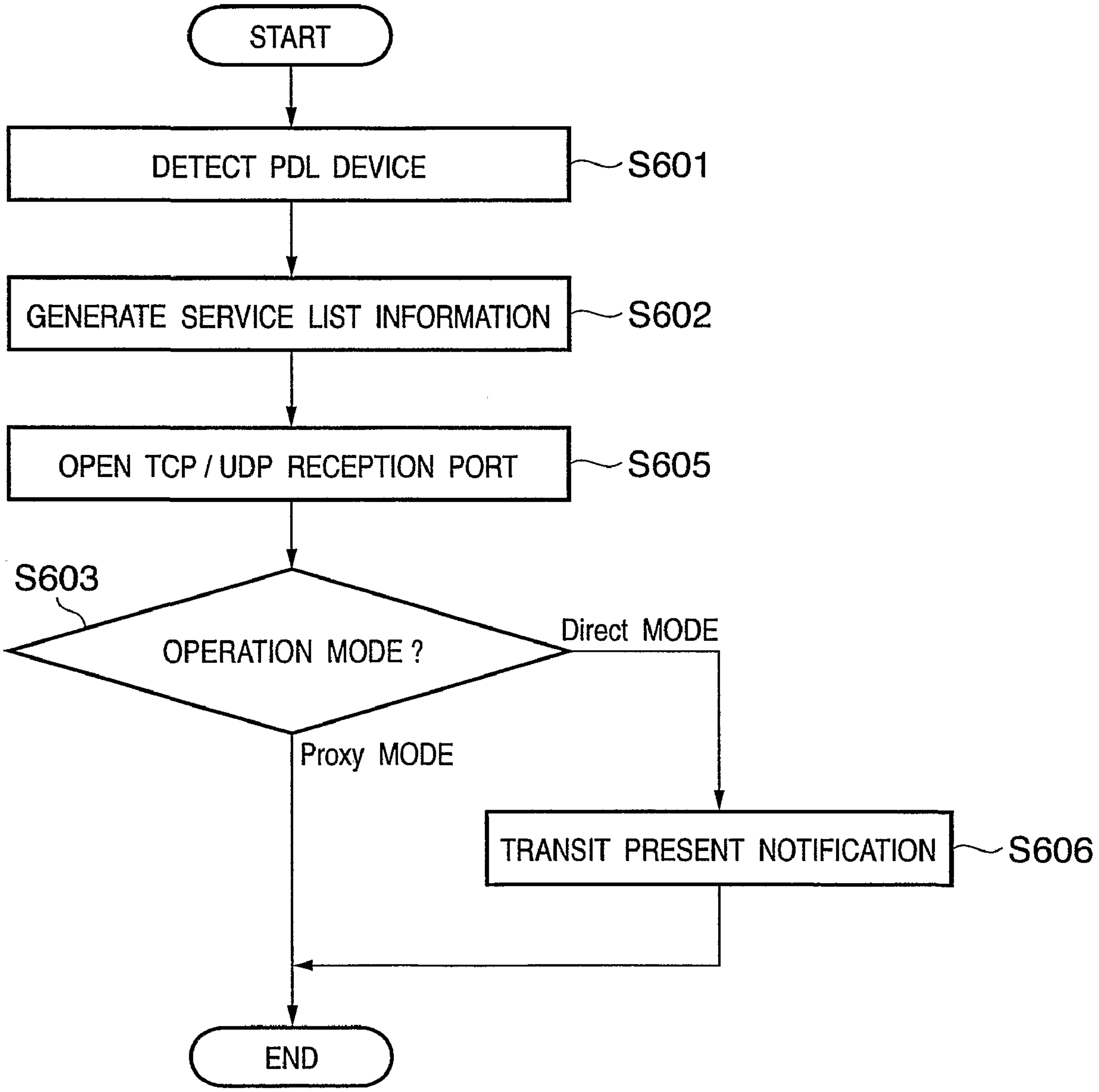
FIG. 19 is a flowchart showing initialization processing when a device according to the second embodiment of the present invention is activated.

FIG. 19 is a flowchart showing initialization processing when a device according to the second embodiment of the present invention is activated.

In the processing shown in FIG. 19, the processing order in FIG. 6 of the first embodiment is changed, and the processing in step S604 is omitted.

That is, in FIG. 19, before determination in step S603, the TCP/UDP reception port is opened in step S605 as a port to receive a device search request independently of whether the operation mode is the Proxy mode or Direct mode.

Hence, a device 400 can receive a device search request by multicast even in the Proxy mode.

If it is determined in step S603 that the operation mode is the Direct mode, a device presence notification is transmitted by multicast in step S606.

Determination processing of determining whether the device 400 that has received the device search request matches the search condition indicated by the request in the sequence shown in FIG. 10 will be described next with reference to FIG. 20.

Figure 20:
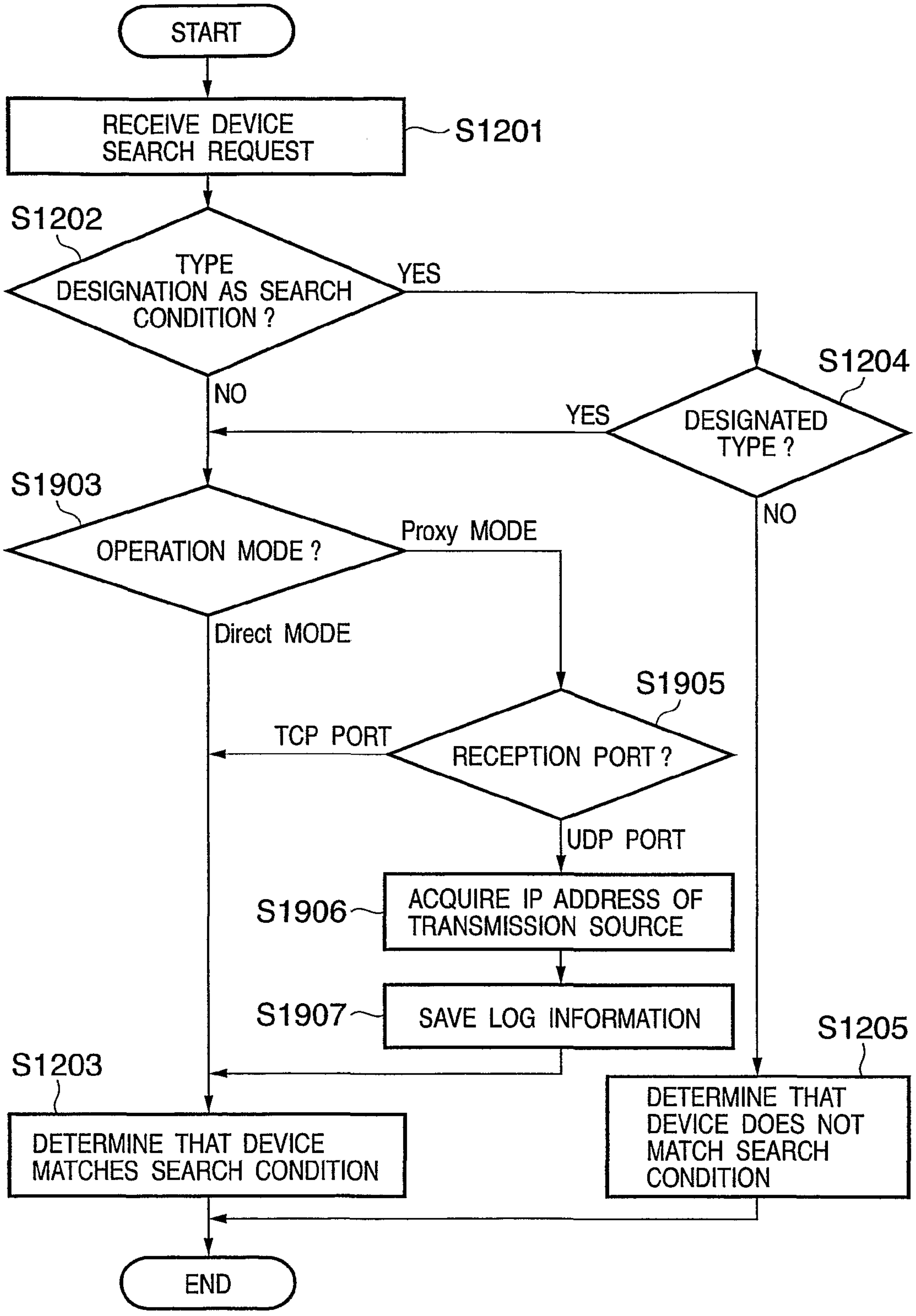
FIG. 20 is a flowchart showing determination processing according to the second embodiment of the present invention.

FIG. 20 is a flowchart showing determination processing according to the second embodiment of the present invention.

The same step numbers as in FIG. 12 of the first embodiment denote the same steps in FIG. 20, and a detailed description thereof will be omitted.

If no type designation is present in step S1202, or if it is determined in step S1204 that type designation is present although the device does not have the designated type, the device 400 acquires the device value held in a RAM 402 and determines the operation mode of its own in step S1903.

If the operation mode is the Direct mode, the flow advances to step S1203 to determine that the device matches the search condition.

If the operation mode is the Proxy mode, the flow advances to step S1905 to determine whether the device search request reception port is the TCP port (unicast) or UDP port (multicast).

If the reception port is the TCP port, the flow advances to step S1203. If the reception port is the UDP port, the flow advances to step S1906 to acquire an IP address as the host information of an information processing apparatus 510 that has transmitted the device search request. In step S1907, the acquired IP address is saved in the RAM 402 as search log information. Then, the flow advances to step S1203.

An example of search log information will be described here with reference to FIG. 21.

FIG. 21 is a view showing an example of search log information according to the second embodiment of the present invention.

The search log information shown in FIG. 21 manages pieces of host information (IP addresses) of information processing apparatuses (host computers) that have issued device search requests. Especially FIG. 21 indicates that device search requests by multicast are received from information processing apparatuses with IP addresses "192.168.0.2" and "192.168.0.3".

Generation processing of causing the device to generate a service list contained in device information in step S1004 of the sequence shown in FIG. 10 will be described next with reference to FIG. 22.

Figure 22:
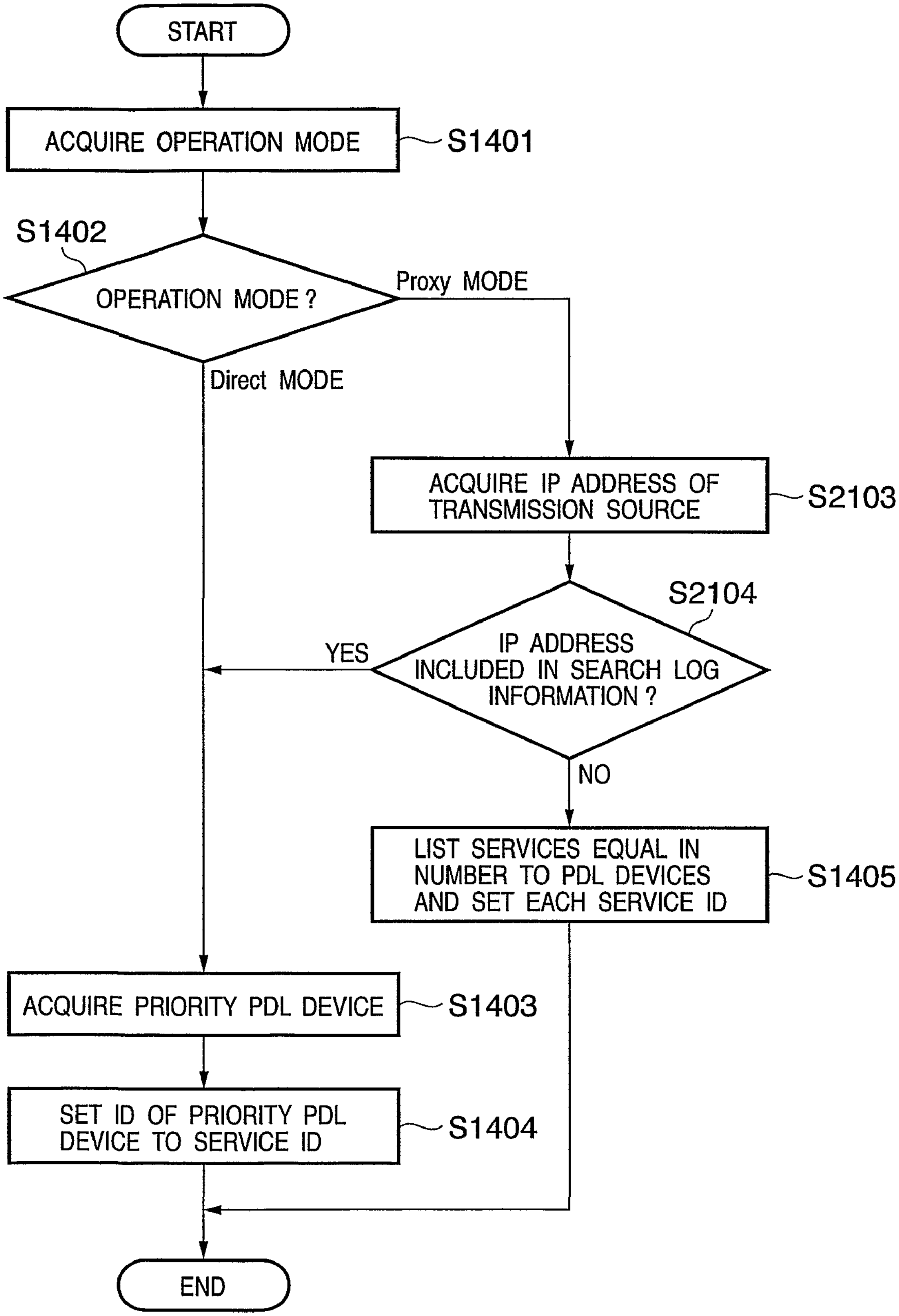
FIG. 22 is a flowchart showing generation processing according to the second embodiment of the present invention.

FIG. 22 is a flowchart showing generation processing according to the second embodiment of the present invention.

The same step numbers as in FIG. 15 of the first embodiment denote the same steps in FIG. 22, and a detailed description thereof will be omitted.

If the operation mode is the Proxy mode in step S1402, the flow advances to step S2103 to acquire the IP address of the information processing apparatus 510 of the transmission source from the received device information request.

In step S2104, it is determined whether the IP address acquired in step S2103 is contained in the search log information saved in the RAM 402. If the IP address is contained in the search log information (YES in step S2104), the flow advances to step S1403 to set, as a priority PDL device, a PDL device corresponding to the IP address of the information processing apparatus held in the search log information. Then, the flow advances to step S1404.

If the IP address is not contained in the search log information (NO in step S2104), the flow advances to step S1405.

As described above, according to the second embodiment, in addition to the effects described in the first embodiment, even in the Proxy mode, an information processing apparatus that uses no server apparatus can easily install a printer driver and use it.

Third Embodiment

In the first and second embodiments, the device determines its operation mode and generates device information on the basis of the operation mode. However, the present invention is not limited to this.

Figure 23:
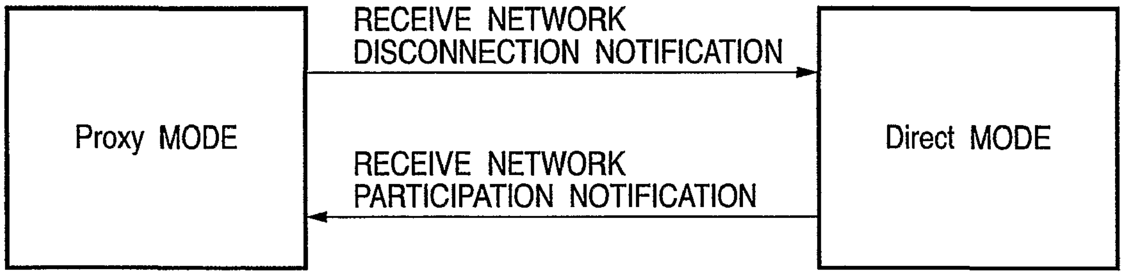
FIG. 23 is a view for explaining transition of an operation mode according to the third embodiment of the present invention.

For example, as shown in FIG. 23, the operation mode may adaptively be changed in accordance with data exchange between the device and the server apparatus. More specifically, when the device that is operating in the Proxy mode receives a network disconnection notification from the server apparatus, the operation mode changes to the Direct mode. Conversely, when the device that is operating in the Direct mode receives a network participation notification from the server apparatus, the operation mode changes to the Proxy mode.

The device can automatically change the operation mode of its own by detecting the behavior of the server apparatus. Even when the server apparatus is temporarily absent, the user can use the device.

The behavior of the server apparatus is detected in the following way. For example, when the device manages the host information (identification information (e.g., IP address)) of the server apparatus in advance, a search request may be issued to the server apparatus specified by the host information, and the presence/absence of a response is determined. Alternatively, a communication port (TCP/UDP port) of the device may be monitored to determine the presence/absence of a search request from the server apparatus on the network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-252679, filed Aug. 31, 2005, which is hereby incorporated by reference herein in its entirety.

The invention claimed is:

1. An image forming apparatus which is connected to a network and can communicate with an information processing apparatus on the network, comprising:

a plurality of image forming means;

determination means for determining an operation mode of the image forming apparatus, wherein said determination means comprises acquisition means for acquiring network information, and wherein said determination means determines, on the basis of the network information acquired by said acquisition means, the operation mode as one of a first operation mode without intervention of a predetermined information processing apparatus and a second operation mode with intervention of a predetermined information processing apparatus;

reception means for receiving an information request transmitted from the information processing apparatus; and transmission means for transmitting, on the basis of the operation mode determined by said determination means, identification information containing an identifier of at least one of said plurality of image forming means in response to the information request received by said reception means.

2. The apparatus according to claim 1, further comprising search request reception means for receiving a search request by multicast from the information processing apparatus when the operation mode is the first operation mode and receiving a search request by unicast from the information processing apparatus when the operation mode is the second operation mode.

3. The apparatus according to claim 1, wherein when the operation mode is the first operation mode, said transmission means transmits identification information containing an identifier of a designated one of said plurality of image forming means, and when the operation mode is the second operation mode, said transmission means transmits identification information containing an identifier of each of said plurality of image forming means.

4. The apparatus according to claim 3, further comprising designation means for designating priority image forming means from said plurality of image forming means.

5. The apparatus according to claim 1, wherein said acquisition means issues a search request by multicast to the network and acquires the network information on the basis of presence/absence of a response to the search request.

6. The apparatus according to claim 1, wherein said acquisition means checks presence/absence of DNS setting information and, if DNS setting is present, issues a search request to a DNS server and acquires the network information on the basis of an analysis result of a response to the search request.

7. The apparatus according to claim 1, further comprising:

search request reception means for receiving a search request by multicast from the information processing apparatus; and storage means for storing identification information representing the information processing apparatus that has transmitted the search request received by said search request reception means, wherein said transmission means compares, on the basis of the operation mode determined by said determination means, the identification information stored in said storage means with identification information of an information processing apparatus that has transmitted the information request received by said reception means and, on the basis of a comparison result, transmits the identification information containing the identifier of at least one of said plurality of image forming means.

8. The apparatus according to claim 1, further comprising change means for changing the second operation mode to the first operation mode upon detecting a network disconnection notification from the information processing apparatus and changing the first operation mode to the second operation mode upon detecting a network participation notification from the information processing apparatus.

9. An image forming system formed by connecting an image forming apparatus to an information processing apparatus through a network, wherein the image forming apparatus comprises:

a plurality of image forming means;

determination means for determining an operation mode of the image forming apparatus, wherein said determination means comprises acquisition means for acquiring network information, and wherein said determination means determines, on the basis of the network information acquired by said acquisition means, the operation mode as one of a first operation mode without intervention of a predetermined information processing apparatus and a second operation mode with intervention of a predetermined information processing apparatus;

first reception means for receiving an information request transmitted from the information processing apparatus; and transmission means for transmitting, on the basis of the operation mode determined by said determination means, identification information containing an identifier of at least one of said plurality of image forming means in response to the information request received by said first reception means, and wherein the information processing apparatus comprises:

second reception means for receiving the identification information from the image forming apparatus; and installation means for installing a device driver to use the image forming apparatus on the basis of the identification information received by said second reception means.

10. A control method of an image forming apparatus which is connected to a network and can communicate with an information processing apparatus on the network, comprising steps of:

determining an operation mode of the image forming apparatus, wherein said determination comprises acquiring network information, and determining, on the basis of the acquired network information, the operation mode as one of a first operation mode without intervention of a predetermined information processing apparatus and a second operation mode with intervention of a predetermined information processing apparatus;

receiving an information request transmitted from the information processing apparatus; and transmitting, on the basis of the operation mode determined in the determination step, identification information containing an identifier of at least one of a plurality of image forming means provided in the image forming apparatus in response to the information request received in the reception step.

11. A program stored in a non-transitory computer-readable storage medium, which causes a computer to execute control of an image forming apparatus which is connected to a network and can communicate with an information processing apparatus on the network, characterized by causing the computer to execute steps of:

determining an operation mode of the image forming apparatus, wherein said determination comprises acquiring network information, and determining, on the basis of the acquired network information, the operation mode as one of a first operation mode without intervention of a predetermined information processing apparatus and a second operation mode with intervention of a predetermined information processing apparatus;

receiving an information request transmitted from the information processing apparatus; and transmitting, on the basis of the operation mode determined in the determination step, identification information containing an identifier of at least one of a plurality of image forming means provided in the image forming apparatus in response to the information request received in the reception step.

* * * * *